United States Patent
Beck et al.

(10) Patent No.: US 12,350,758 B2
(45) Date of Patent: Jul. 8, 2025

(54) PROCEDURE FOR LASER DRILLING A PLURALITY OF HOLES ON THE BASIS OF THE FOCAL POSITION

(71) Applicant: Siemens Energy Global GmbH & Co. KG, Bayern (DE)

(72) Inventors: Thomas Beck, Panketal (DE); Oliver Katzurke, Berlin (DE); Marcel Vollgold, Potsdam (DE); Richard Zimmermann, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 318 days.

(21) Appl. No.: 17/778,150

(22) PCT Filed: Oct. 29, 2020

(86) PCT No.: PCT/EP2020/080411
§ 371 (c)(1),
(2) Date: May 19, 2022

(87) PCT Pub. No.: WO2021/104792
PCT Pub. Date: Jun. 3, 2021

(65) Prior Publication Data
US 2023/0001515 A1    Jan. 5, 2023

(30) Foreign Application Priority Data
Nov. 26, 2019   (DE) ................... 10 2019 218 292.5

(51) Int. Cl.
*B23K 26/382*     (2014.01)
*B23K 26/0622*    (2014.01)
(Continued)

(52) U.S. Cl.
CPC ........ *B23K 26/389* (2015.10); *B23K 26/0624* (2015.10); *B23K 26/384* (2015.10); *B23K 2101/001* (2018.08); *F05D 2230/13* (2013.01)

(58) Field of Classification Search
CPC ............. B23K 26/389; B23K 26/0624; B23K 26/384; B23K 2101/001; B23K 26/382;
(Continued)

(56) References Cited

U.S. PATENT DOCUMENTS

2003/0127438 A1* 7/2003 Richter ................ B23K 26/389
219/121.61
2006/0278613 A1* 12/2006 Hess ...................... B23K 26/08
156/345.24
(Continued)

FOREIGN PATENT DOCUMENTS

DE        10063309 A1     7/2002
DE     102011000144 A1    8/2011
(Continued)

OTHER PUBLICATIONS

PCT International Search Report and Written Opinion of International Searching Authority mailed Feb. 18, 2021 corresponding to PCT International Application No. PCT/EP2020/080411 filed Oct. 29, 2020.

*Primary Examiner* — Tiffany T Tran
(74) *Attorney, Agent, or Firm* — Wolter Van Dyke Davis, PLLC

(57) ABSTRACT

A method for producing a plurality of holes in a curved surface, wherein the individual holes are removed layer by layer, the first layers to be removed of the holes being arranged at different distances in a Z-direction of the laser, the holes each being processed at a specific focal position, wherein only the holes detected from the same focal position are processed.

9 Claims, 1 Drawing Sheet

(51) Int. Cl.
*B23K 26/384* (2014.01)
*B23K 101/00* (2006.01)

(58) Field of Classification Search
CPC ............. B23K 26/0622; B23K 26/386; B23K 26/046; F05D 2230/13; F02C 7/18; G05B 2219/45139
USPC .............................. 29/890.02, 418; 219/121
See application file for complete search history.

(56) References Cited

U.S. PATENT DOCUMENTS

| | | | | |
|---|---|---|---|---|
| 2011/0185572 | A1* | 8/2011 | Wei ................ | B23K 26/389 |
| | | | | 29/418 |
| 2013/0029093 | A1* | 1/2013 | Wakioka ............. | B23K 26/361 |
| | | | | 216/87 |
| 2016/0031049 | A1* | 2/2016 | Menke .................. | F01D 5/186 |
| | | | | 29/889.7 |
| 2016/0199945 | A1* | 7/2016 | McDowell ........... | B23K 26/389 |
| | | | | 219/121.7 |

FOREIGN PATENT DOCUMENTS

| | | | | |
|---|---|---|---|---|
| DE | 102014220525 A1 * | 4/2016 | ............. | B23K 26/36 |
| WO | 2006069822 A1 | 7/2006 | | |
| WO | 2013079246 A1 | 6/2013 | | |
| WO | 2016055349 A1 | 4/2016 | | |

* cited by examiner

PROCEDURE FOR LASER DRILLING A PLURALITY OF HOLES ON THE BASIS OF THE FOCAL POSITION

CROSS REFERENCE TO RELATED APPLICATIONS

This application is the US National Stage of International Application No. PCT/EP2020/080411 filed 29 Oct. 2020, and claims the benefit thereof. The International Application claims the benefit of German Application No. DE 10 2019 218 292.5 filed 26 Nov. 2019. All of the applications are incorporated by reference herein in their entirety.

FIELD OF INVENTION

The invention relates to the procedure for producing a plurality of holes, in particular through-holes, in which a laser is used to remove material for the hole.

BACKGROUND OF INVENTION

Through-holes are required in many components, such as, for example, in burner inlet nozzles or in film cooling holes in gas turbine blades.

In this case, it is expedient to use a laser which can work through both an outer ceramic layer and also inner metal layers or metallic or ceramic substrates. For the reproducibility and the protection of the substrate to be drilled, it is necessary that the surrounding material is not excessively heated by the energy input during the production of a hole.

For this reason, it is known that, if a plurality of holes must be produced in a substrate, these can be machined alternately, removal taking place in layers and the sequence of holes to be machined being chosen in such a way that the spacing is as large as possible and there is no heat flow to the other holes.

This process needs to be further improved.

SUMMARY OF INVENTION

It is therefore the object of the invention to solve the problem mentioned above.

The object is achieved by a procedure as claimed.

The subclaims list further advantageous measures which can be combined with one another as desired in order to achieve further advantages.

DETAILED DESCRIPTION OF INVENTION

Figure 2:
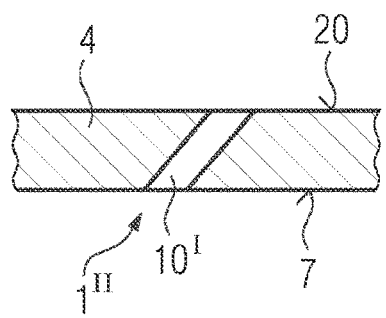
FIGS. 2, 3 show shapes of holes to be produced.

FIG. 2 shows a first exemplary embodiment of a through-hole 10' of a component 1" comprising a substrate 4.

The through-hole 10' is advantageously constant in cross section, in particular cylindrical or oval-shaped, in the cross section of a through-flow direction of a cooling medium in the through-hole 10' and can run at a certain angle to the outer surface 20. In this case, for example, a cooling fluid flows out of the interior through the through-hole 10' (e.g. film cooling hole). The inner cavity is bounded by the inner surface 7.

Figure 1:
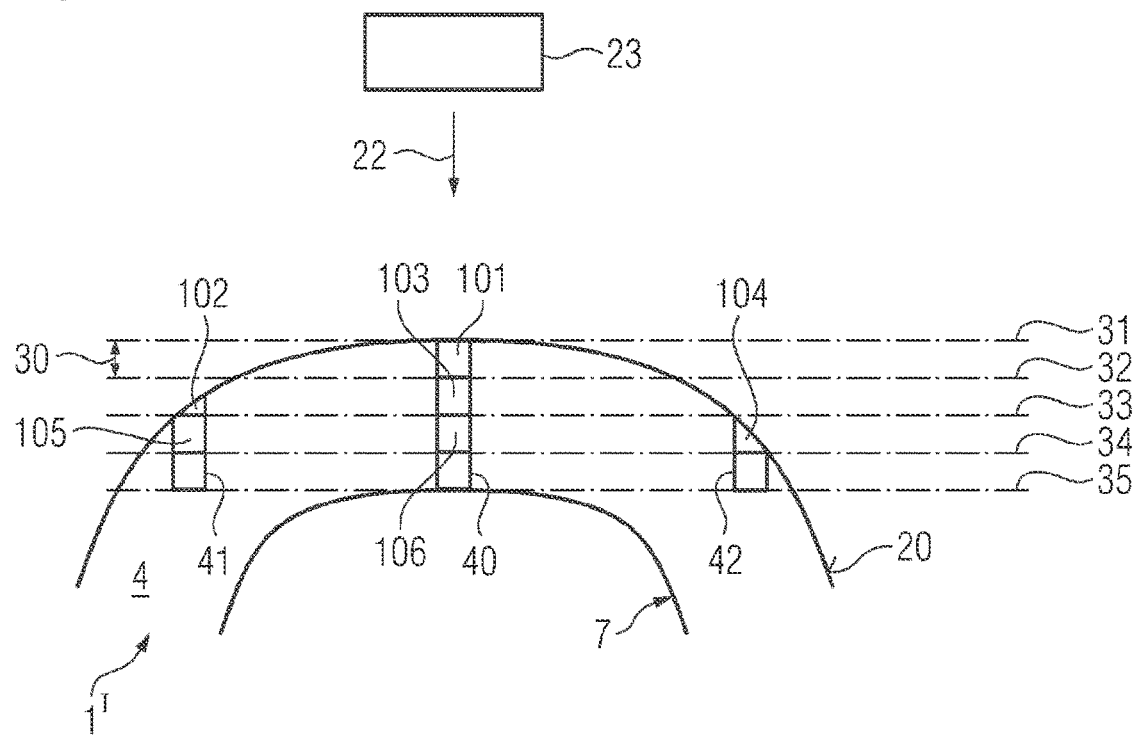
FIG. 1 shows the procedure schematically.
Figure 3:
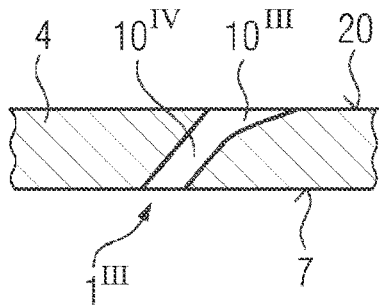

FIG. 3 shows a further through-hole $10^{IV}$, which in addition to FIG. 2 has a diffuser 10''', which represents a widening of the hole in the region of the surface 20, which, here too, can be curved as in FIG. 1.

The curvature of the surface 20 or any layers present (metallic layer, TBC) are not illustrated here.

FIG. 1 schematically illustrates the procedure according to the invention which is applied to curved surfaces 20 of a component 1', 1", 1''' with or without coatings (TBC).

A plurality of holes 40, 41, 42, . . . are to be produced simultaneously at different locations.

In a Z direction 22 and a beam direction of a laser 23, planes 31, 32, 33, 34, 35, . . . perpendicular thereto are defined.

The first plane 31 represents, in particular, a secant to the surface 20 and advantageously, but not necessarily, touches a first hole 40, which, however, is in any case closest to the laser 23 in the Z direction 22. This is due to curvature and could be used to define "curvature".

The laser 23 advantageously operates at a certain distance from the machined component, in this case, in particular, the focal position, i.e. the planes 31, 32, . . . .

In order to allow faster machining, the procedure according to the invention also depends on the focal position, which is taken here as the illustrative clearance of the laser.

The first plane 31 thus represents the first focal position, in which material is removed.

Thus, a first layer 101 of the first hole 40 to be produced is removed first. Another layer of another hole 41, 42 does not lie in the plane 31 of the current focal position, for example.

A second plane 32 is then reached. Below this plane 32 in the thickness 30 of a region to be removed (=layer), two holes 40, 41 are now included, namely a second layer 103 below the first layer 101 of the first hole 40 and a first layer 102, here an outermost region, of a second hole 41. The removed second layer 103 of the first hole 40 extends over the entire thickness 30 below the second plane 32 whereas the removed first layer 102 of the second hole 41 extends over less than the thickness 30 below the second plane 32. These layers 102, 103 are then removed next, wherein the first layer 102 of the second hole 41 is advantageously removed first after the first layer 101 for the first hole 40 has been removed and then advantageously the second layer 103 of the first hole 40 is removed.

In the next step, the shifted focal position of the laser 23 encompasses the plane 33, a second layer 105 of the second hole 41, as well as a third layer 106 of the first hole 40 and a first layer 104 of the third hole 42, which is machined for the first time after the focal position has advanced.

Since the first hole 40 was advantageously machined last in the previous step, a first partial layer 104 of the third hole 42 and a second layer 105 of the second hole 41 are machined first, and then the third layer 106 of the hole 40 is machined as the next step for this removal plane.

In particular, the shifting of the focal position can take place continuously and, in particular, steadily.

In this way, the procedure is illustrated schematically up to the end, that is to say, in particular, up to the breakthrough for through-holes.

At the beginning, not all the holes 40, 41, 42, . . . are encompassed by a focal position.

Likewise, close to the end of the production process, some holes 40 have already been completed, while other holes 41, 42 still require further machining for completion.

Further modifications are easily recognizable for a person skilled in the art.

Of course, the holes 40, 41, 42 can also extend at a different angle to the surface 20 than illustrated in FIG. 1.

The average power of the laser 23 is advantageously 100 watts to 200 watts.

The laser is advantageously pulsed, wherein, in particular, nanosecond pulses, in particular ≤500 ns, are used.

The invention claimed is:

1. A procedure for producing a plurality of holes in a substrate having a curved surface with a curvature, comprising:
    defining a plurality of planes perpendicular to a beam direction of a laser;
    operating the laser at a first focal position of the laser corresponding to a first plane of the plurality of planes, wherein the first plane represents a secant to the curved surface that touches a first hole of the plurality of holes that is closest to the laser in the beam direction based on the curvature of the curved surface;
    removing material, with the laser operated at the first focal position, from a first layer of the first hole that is encompassed by the first focal position of the laser and the first plane;
    shifting the focal position of the laser from the first focal position to a second focal position that is different from the first focal position and operating the laser at the second focal position of the laser, wherein the second focal position corresponds to a second plane of the plurality of planes that is different from the first plane; and
    removing material, with the laser operated at the second focal position, from a second layer of the first hole and a first layer of a second hole, wherein the second layer of the first hole and the first layer of the second hole are encompassed by the second focal position of the laser and the second plane based on the curvature of the curved surface.

2. The procedure as claimed in claim 1, further comprising:
    shifting the focal position of the laser from the second focal position to a third focal position that is different from the first focal position and the second focal position and operating the laser at the third focal position of the laser, wherein the third focal position corresponds to a third plane of the plurality of planes that is different from the first plane and the second plane; and removing material, with the laser operated at the third focal position, from a third layer of the first hole, a second layer of the second hole and a first layer of a third hole, wherein the third layer of the first hole, the second layer of the second hole and the first layer of the third hole are encompassed by the third focal position and the third plane based on the curvature of the curved surface.

3. The procedure as claimed in claim 1, wherein an average power of the laser is 100W to 200W.

4. The procedure as claimed in claim 1, wherein the laser is pulsed.

5. The procedure as claimed in claim 1, wherein one or more of the plurality of holes that are machined are in a turbine component.

6. The procedure as claimed in claim 1, wherein one or more of the plurality of holes that are machined are a film cooling hole, which has an inner part, and a widening at the curved surface.

7. The procedure as claimed in claim 1, wherein one or more of the plurality of holes that are machined include only one hole with a constant cross section.

8. The procedure as claimed in claim 4, wherein the laser is pulsed using nanosecond pulses <500 ns.

9. The procedure as claimed in claim 6, wherein the film cooling hole has a constant cross section.

* * * * *